(12) United States Patent
Jho

(10) Patent No.: US 6,382,289 B1
(45) Date of Patent: May 7, 2002

(54) BINDING MACHINE FOR GARDENING

(76) Inventor: Nam-Sun Jho, 725-1 Hwangkeun-Dong, Susung-Gu, Daegu (KR)

( * ) Notice: Subject to any disclaimer, the term of this patent is extended or adjusted under 35 U.S.C. 154(b) by 0 days.

(21) Appl. No.: 09/394,410

(22) Filed: Sep. 13, 1999

(51) Int. Cl.⁷ .............................................. A01G 17/08
(52) U.S. Cl. ......................... 156/468; 156/579; 100/6; 100/16; 100/33 R; 100/33 PB; 47/1.01 R
(58) Field of Search ................ 156/46.8, 475, 156/579; 47/1.01 R, 46; 100/6, 16, 33 R, 33 PB, 29

(56) References Cited

U.S. PATENT DOCUMENTS

| | | | | |
|---|---|---|---|---|
| 2,145,339 A | * | 1/1939 | Burns | 100/33 R |
| 4,945,674 A | * | 8/1990 | Alexandrian et al. | 156/468 |
| 5,394,644 A | * | 3/1995 | Ballu | 156/468 |

* cited by examiner

Primary Examiner—Jeff H. Aftergut
Assistant Examiner—Barbara J. Musser
(74) Attorney, Agent, or Firm—Jacobson Holman, PLLC

(57) ABSTRACT

This invention relates to a binding machine which is binding a sapling or a tree branch to a support with a binding tape for fixing, particularly wherein a tape guide bar 2 comprises a garnering case built at the bottom of a body; a binding needle guide bar 3 is installed at the upper side of the body 1 and a binding portion 3a at the front end thereof is formed; a lifting operator 4 is installed at the top of the body 1 and combined with a binding needle guide bar 3 by a rotary axis 5 at one side of the body 1 to rotate each other; the lifting 4 and a pressure lever 401 are linked by a pin; the both support horns 401a of the pressure lever 401 are inserted by a guide 101 installed at the sides of the body 1 so that the pressure lever 401 can be lifted along with the guide 101; an operator 6 is installed at the front end of a lifting operator 4 so that the binding tape 7 projected from a binding portion 3a is drawn out by the operator 6 and bound by a binding needle 301, and then cut by a cutting knife 8, whereby a binding work of a sapling or a tree branch can be conducted quickly and conveniently as well as the waste of a binding tape can be eliminated.

8 Claims, 6 Drawing Sheets

BINDING MACHINE FOR GARDENING

BACKGROUND OF THE INVENTION

1. Field of the Invention

This invention relates to a binding machine for gardening which is binding a sapling or a tree branch to a support with a binding tape for fixing, particularly wherein a binding tape supplied from a garnering case installed at a body below is drawn out by a draft needle to wind a sapling and a support in a work space formed between the body and a lifting operator, and to be fixed in a binding part with using a binding needle and then to be cut by a cutting knife, whereby a fast and convenient binding work can be conducted.

2. Description of the Prior Arts

In the past, for fixing a sapling or a tree branch since a man should carry out by hand everything like the work in which a support is bound together with the sapling or the tree branch by using a string and so forth after sticking the support near to the sapling or the tree branch, the work is inefficient because of inconvenient and long working hours work as well as a large number of labor force are required in case of many work loads. Those are problems in the prior arts.

SUMMARY OF THE INVENTION

This invention is developed to solve the above problems. That is, the object of this invention is to provide a binding machine wherein a binding tape supplied from a garnering case installed at the bottom of a body is drawn out by a draft needle to wind a sapling and a support in a work space formed between the body and a lifting operator and to adhere the lifting operator to the body; and then the binding tape is fixed with a binding needle in a binding part and cut by a cutting knife so that the sapling and the support are bound by the binding tape. This invention is described in more detail with the attached drawings as follow.

DETAILED DESCRIPTION OF THE PREFERRED EMBODIMENT

Figure 1:
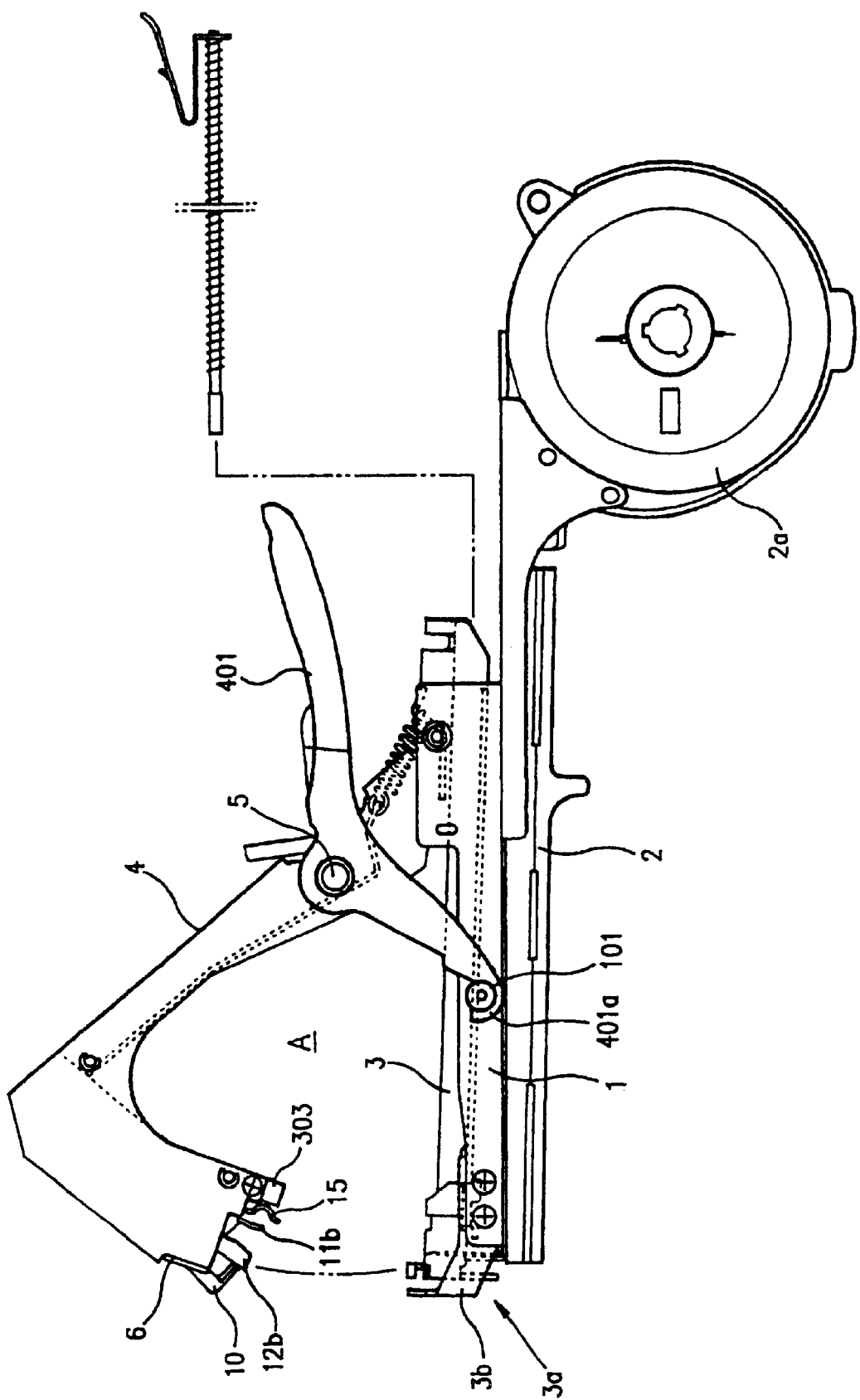
FIG. 1 is a side view illustrating this invention.
Figure 2:
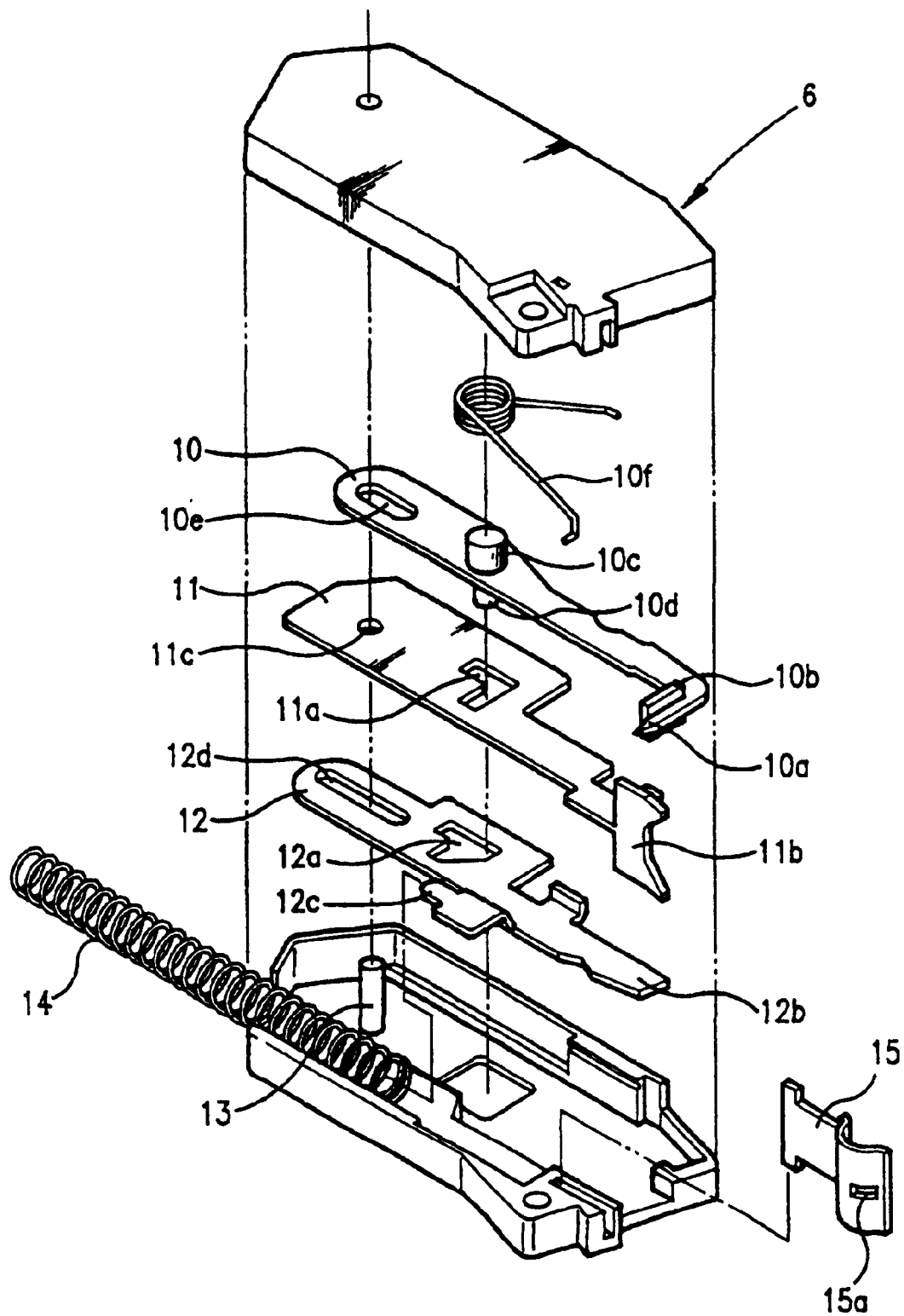
FIG. 2 is a exploded perspective drawing of the operator according to this invention.
Figure 3:
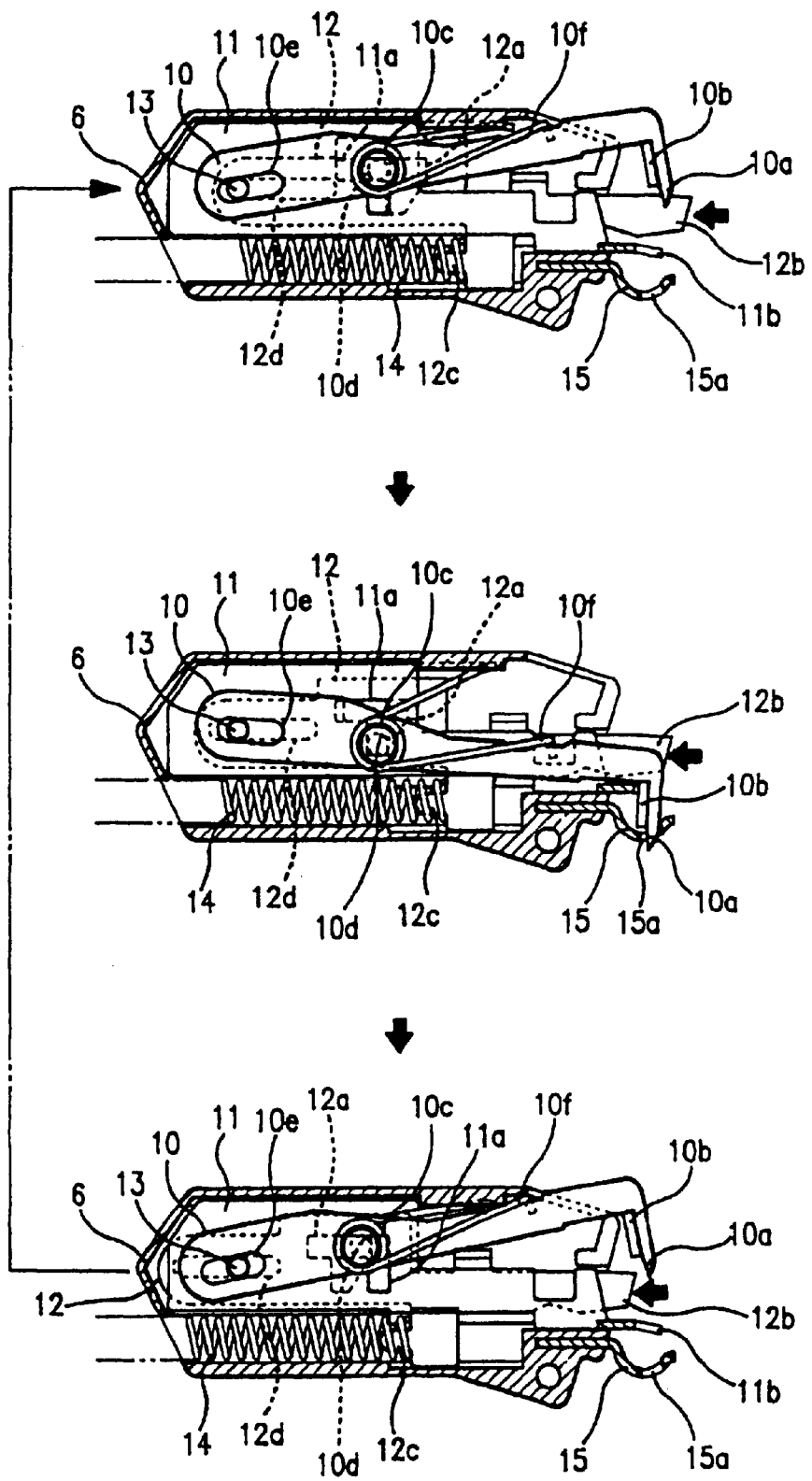
FIG. 3 is a sectional view illustrating the operating process of the operator according to this invention.
Figure 4:
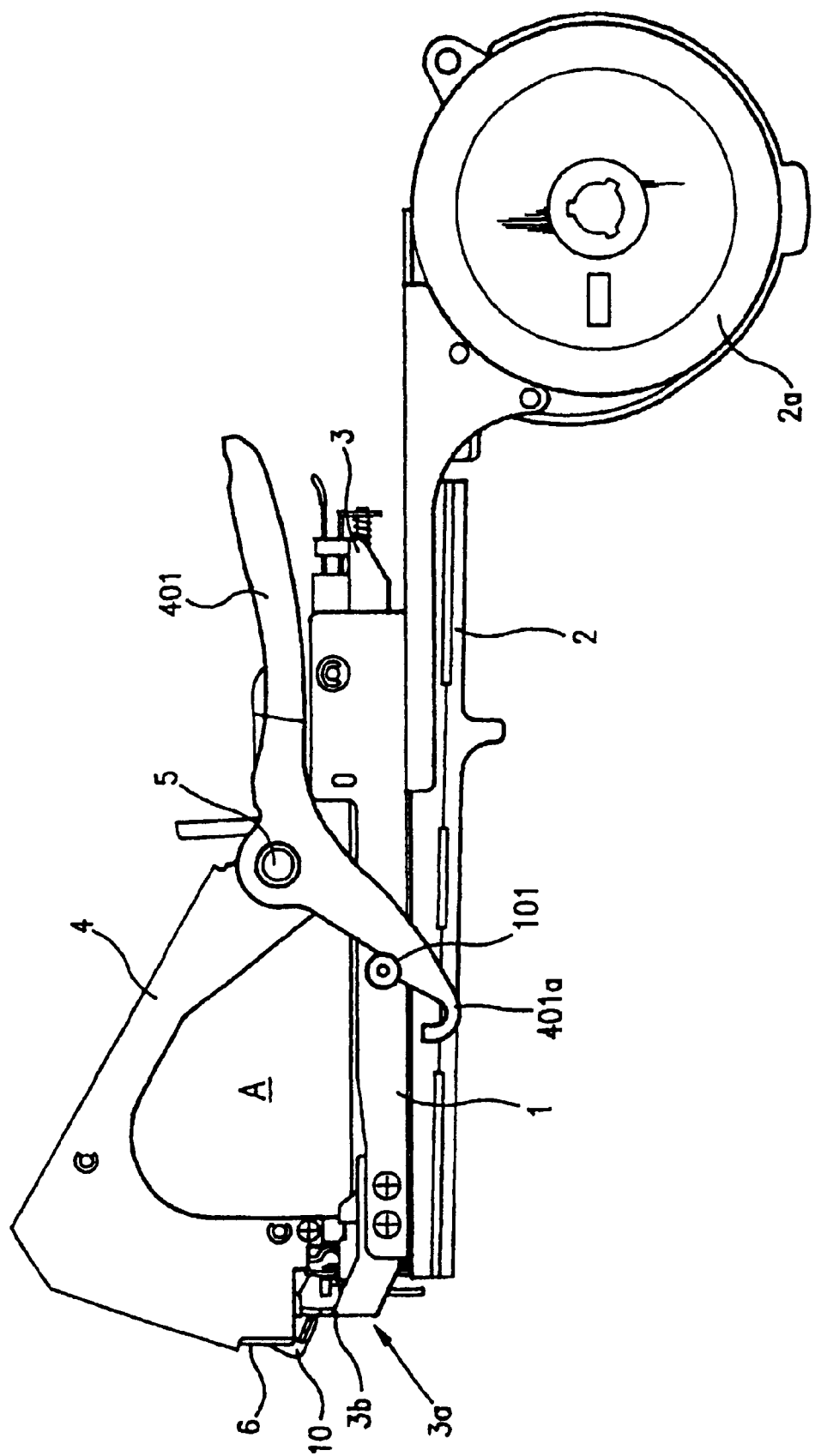
FIG. 4 is an illustration view showing the operation state of the lifting operator according to this invention.
Figure 5:
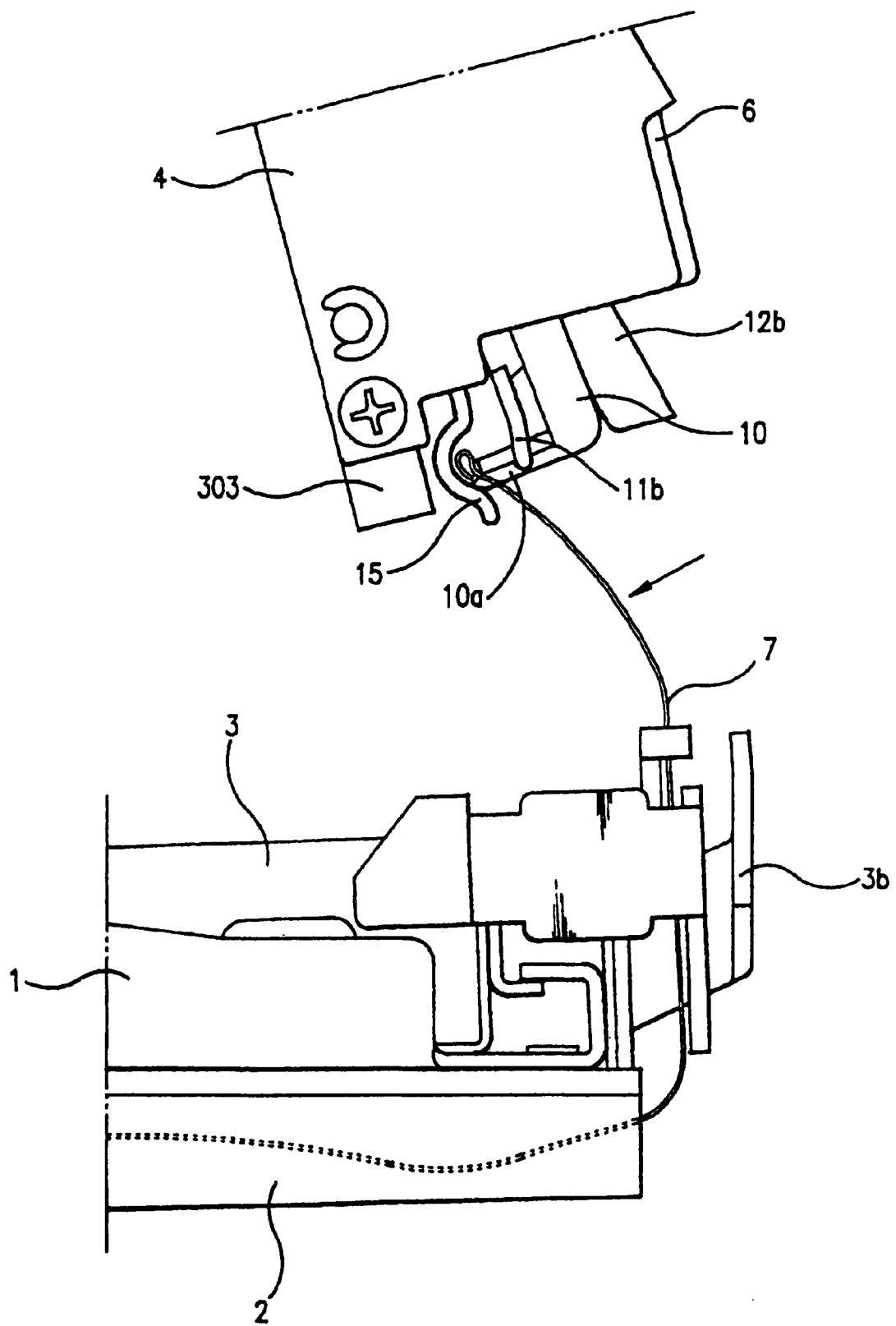
FIG. 5 is an illustration view showing the drawn state of the binding tape according to this invention.
Figure 6:
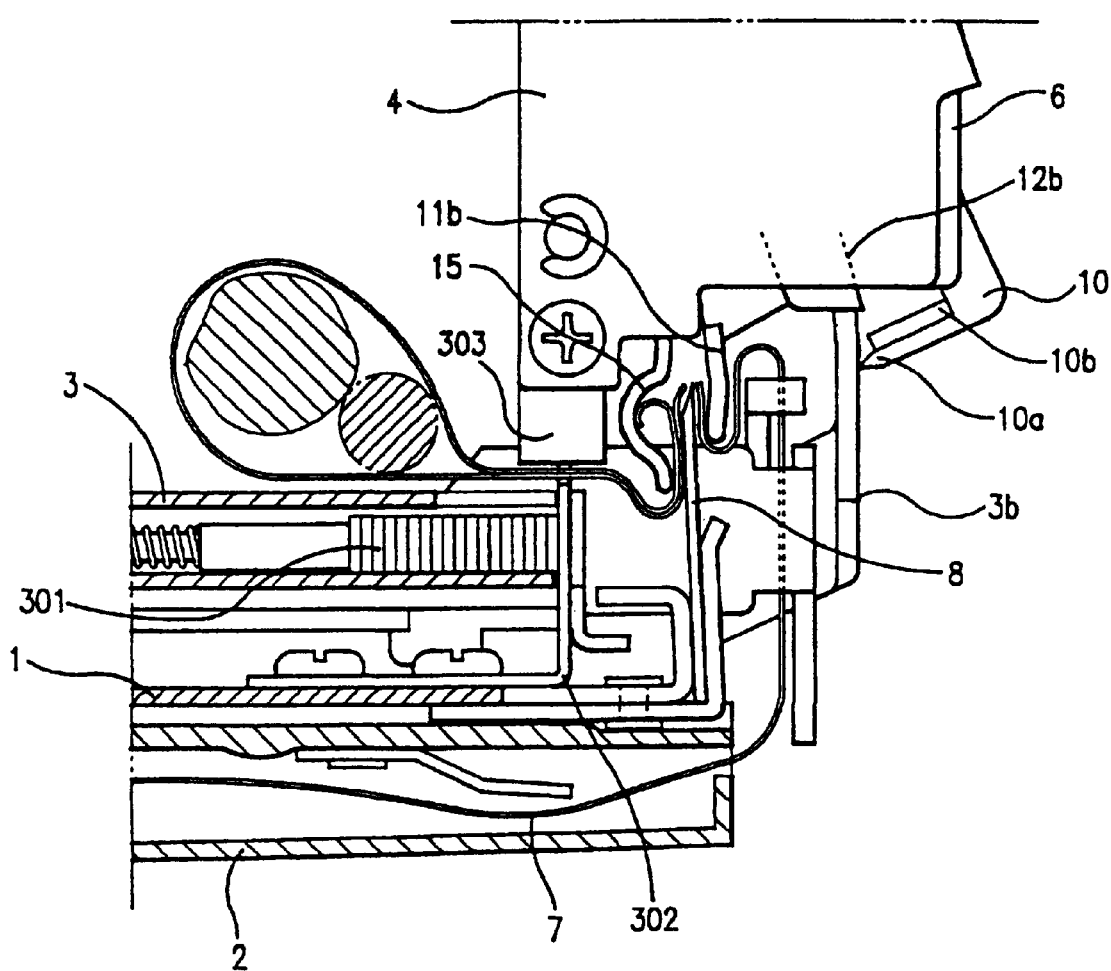
FIG. 6 is a sectional illustration view showing the bound state of the binding tape according to this invention.

The tape guide bar 2 comprises the tape garnering case 2a installed at the bottom of the body 1 of which one side is open; the binding needle guide bar 3 built at the upper side of the body 1 comprises the binding portion 3a at the front end thereof; the lifting operator 4 is set at the top side of the body 1, wherein the lifting operator 4 is combined with the binding needle guide bar 3 at one side of the body 1 by the rotary axis 5 in order to rotate each other and linked to the pressure lever 401 by a pin; the both side support horns 401a of the pressure lever 401 are inserted by the guide 101 installed at sides of the body 1 so that the pressure lever 401 can be lifted along with the guide 101; and the operator 6 is installed at the front end of the lifting operator 4, whereby the binding tape 7 projected from the binding portion 3a is drawn out by the operator 6, bound by the binding needle 301 and cut by the cutting knife 8.

On the other hand, in the operator 6 installed at the front end of the lifting operator 4, the tape draft needle 10a is formed at the front end of the tape holder board 10 and the finger jaw 10b is formed at the rear of the tape holder board 10. The tape holder board 10 is biased by the elastic arm 10f of a spring mechanism in which the fixed axis 10c on one side of the operator is inserted. The rotary axis 10d formed at the opposite side of the fixed axis 10c is passed through the leading hole 11a formed in the leading board 11 to be inserted into the operating hole 12a formed in the pressure operating board 12. The pressing arm 11b includes the inward groove formed at the front end of the leading board 11 and the spring clamped tool 12c is formed at one side of the pressure operating board 12 including the pressure portion 12b at the front end thereof. The coiled spring 14 can be installed in the setting hole 601 of the operator 6 and the long holes 10e, 12d and the passage holes 11c of each board can be inserted by the connecting pin 13.

According to the present invention constituted as above, when the pressure lever 401 is pressed, in the state that the binding tape 7 is exposed to the binding portion 3a, in order to push the operator 6 installed at the front end of the lifting operator 4 near to the binding portion 3a, the operating protuberance 3b formed at the binding portion 3a is adhered to the pressure portion 12b of the pressure operating board 12 projected outward from the operator 6. If the pressure lever 401 is pressed more to apply some pressure, the pressure portion 12b adhered to the operating protuberance 3b is pushed to rise.

At this time, the rotary axis 10d of the tape holder board 10, being on the upper part of the operating hole 12a, in the state that it is inserted in the operating hole 12a of the pressure operating board 12 passing through the leading hole 11a of the leading board 11, is dropped below the operating hole 12a by the backdown of the operating hole 12a of the pressure operating board 12 and the elastic arm 10f inserted in the fixed axis 10c of the tape holder board 10. At the same time, the pressure operating board 12 rotates, centering around the connecting pin 13, so that the tape draft needle 10a formed at the front end thereof is pierced in the binding tape 7 projected from the binding portion 3a. The finger jaw 10b is formed at the rear of the tape draft needle 10a to hinder the tape draft needle 10a from advancing too much after boring through the binding tape 7. When the operator 6 of the lifting operator 4 is kept away from the binding portion 3a by reducing the pressing force on the pressure lever 401, the binding tape 7 pierced by the tape draft needle 10a is drawn out and stretched.

The outside of said binding tape 7 so stretched is adhered closely to the desired part for binding and put into the working space A inside the binding machine. And then, after adhering the operating protuberance 3b to the pressure portion 12b of the pressure 12 by pressing the pressure lever 401 again, if more force is pressed on the pressure lever 401, the rotary axis 10d of the tape holder board 10 is moved along the inclined face of the operating hole 12a formed in the pressure operating board 12, whereby the tape draft needle 10a is separated outward from the binding tape 7 and the binding needle 301 stored in the binding needle guide bar 3 is projected by the pressure flap 302 to pass through the binding tape 7.

At this time, the binding needle 301 is compressed by the binding needle bent board 303 installed at the lifting operator 4 to fix the binding tape 7. The pressing arm 11b projected from the operator 6 and the pressure protuberance flap 15 press the binding tape 7 simultaneously with placement against the cutting knife 8 to cut the binding tape 7. As a result, the binding is accomplished.

As we know in the above description, the present invention has advantages that the binding work of a sapling or a tree branch can be managed quickly and conveniently because of the easy draw out, binding and cutting of the binding tape; and that, since the tape garnering case is installed at the bottom of the binding machine, the binding tape waste can be eliminated as well as the exact binding by the smooth binding tape supply can be accomplished.

What is claimed is:

1. A binding machine for gardening, comprising:
    a body with a bottom and an upper portion;
    a tape guide bar with a tape garnering case installed at the bottom of the body;
    a binding needle guide bar built at the upper portion of the body and having a binding portion;
    a lifting operator set at the upper portion of the body, said lifting operator being linked by a pin to a pressure lever having two side support horns;
    both side support horns of the pressure lever having inserted therein a guide installed at sides of the body so that the pressure lever, when lifted, travels along the guide until said guide engages said side support horns; and
    an operator installed at a front end of the lifting operator, whereby a binding tape projected from the binding portion is drawn out by the operator, held by a binding needle and cut by a cutting knife.

2. The binding machine according to claim 1, wherein the operator installed at the front end of the lifting operator includes a tape holder board having a front end and a rear end, a tape draft needle installed at the front end of the tape holder board and a finger jaw formed at the rear end of the tape holder board, the tape holder board being biased by a spring mechanism with an elastic arm through which mechanism a fixed axis of the operator 6 is inserted, a rotary axis of said operator being formed opposite said fixed axis and passing through a leading hole formed in a leading board to be inserted into an operating hole formed in a pressure operating board, wherein a pressing arm formed on said leading board includes an inward groove formed at a front end of said leading board and a spring clamped tool formed at one side of the pressure operating board includes a pressure portion at a front end thereof.

3. The binding machine as set forth in claim 1, said operator including:
    a tape holder board having a front end, a rear end, a fixed axis, and a rotary axis formed opposite said fixed axis, said tape holder board further including a tape draft needle installed at said front end and a finger jaw formed at said rear end, said tape holder board being biased by a spring mechanism with an elastic arm through which mechanism said fixed axis is inserted, said rotary axis opposite said fixed axis passing through a leading board and then being inserted into a pressure operating board.

4. The binding machine as set forth in claim 3, said operator further including a connecting pin inserted through respective holes in said pressure operating board, said leading board, and said tape holder board.

5. A binding machine for gardening, comprising:
    a body with a bottom, an upper portion, and at least one open side;
    a tape guide bar with a tape garnering case installed at the bottom of the body;
    a binding needle guide bar at the upper portion of the body and having a binding portion at a front end thereof;
    a lifting operator set at the upper portion of the body, said lifting operator being joined with the binding needle guide bar at one side of the body by a rotary axis, said lifting operator being linked by a pin to a pressure lever having two side support horns;
    both side support horns of the pressure lever having inserted therein a guide installed at sides of the body so that the pressure lever, when lifted, travels along the guide until said guide engages said side support horns; and
    an operator installed at a front end of the lifting operator, whereby a binding tape projected from the binding portion is drawn out by the operator, held by a binding needle and cut by a cutting knife.

6. The binding machine according to claim 5, wherein the operator installed at the front end of the lifting operator includes a tape holder board having a front end and a rear end, a tape draft needle installed at the front end of the tape holder board and a finger jaw formed at the rear end of the tape holder board, the tape holder board being biased by a spring mechanism with an elastic arm through which mechanism a fixed axis of the operator is inserted, a rotary axis of said operator being formed opposite said fixed axis and passing through a leading hole formed in a leading board to be inserted into an operating hole formed in a pressure operating board, wherein a pressing arm formed on said leading board includes an inward groove formed at a front end of said leading board and a spring clamped tool formed at one side of the pressure operating board includes a pressure portion at a front end thereof.

7. The binding machine as set forth in claim 5, said operator including:
    a tape holder board having a front end, a rear end, a fixed axis, and a rotary axis formed opposite said fixed axis, said tape holder board further including a tape draft needle installed at said front end and a finger jaw formed at said rear end, said tape holder board being biased by a spring mechanism with an elastic arm through which mechanism said fixed axis is inserted, said rotary axis opposite said fixed axis passing through a leading board and then being inserted into a pressure operating board.

8. The binding machine as set forth in claim 7, said operator further including a connecting pin inserted through respective holes in said pressure operating board, said leading board, and said tape holder board.

* * * * *